Nov. 24, 1964 B. BRIGHTMAN 3,158,691
RAMP PULSE POSITION MULTIPLEX SYSTEM
Filed June 7, 1961
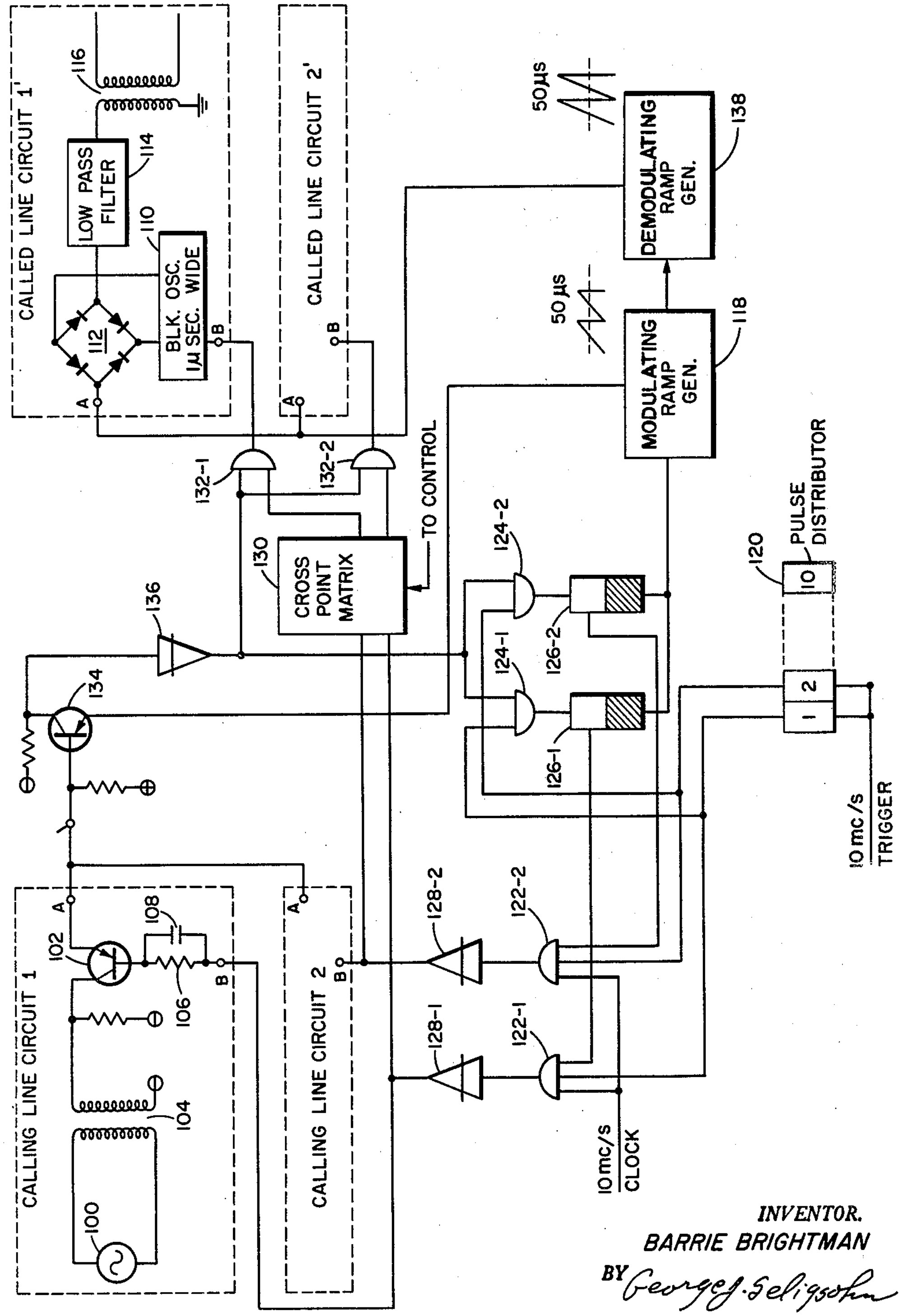
INVENTOR.
BARRIE BRIGHTMAN
BY George J. Seligsohn
ATTORNEY

United States Patent Office 3,158,691

Patented Nov. 24, 1964

3,158,691

RAMP PULSE POSITION MULTIPLEX SYSTEM

Barrie Brightman, Webster, N.Y., assignor to General Dynamics Corporation, Rochester, N.Y., a corporation of Delaware Filed June 7, 1961, Ser. No. 115,373
5 Claims. (Cl. 179—15)

This invention relates to a time division multiplex system and, more particularly, to a ramp pulse position multiplex system.

Time division multiplex systems for transmitting a plurality of analog signals over a common highway are well known in the art. In such systems, each of the analog signals is sampled in sequence during an assigned time position and the samples are transmitted serially over the common highway to a terminating point at which demultiplexing takes place. One of the problems of such time division multiplexing systems is the transmission power loss which takes place. It is possible to avoid such transmission power loss by transmitting the information in digital form. However, this involves the need for relatively complex and expensive analog to digital and digital to analog converters.

The present invention, by utilizing a pulse position mode of signal transmission, overcomes the problem of transmission power loss without the need for complex analog to digital and digital to analog converters. In fact, signal amplification, rather than power loss, is achieved by the present invention.

It is, therefore, an object of the present invention to provide a ramp pulse position multiplex system.

This and other objects, features and advantages of the present invention will become more apparent from the following detailed description taken together with the accompanying drawing in which the sole figure is a block and schematic diagram of a preferred embodiment of the invention.

The drawing provides a ten-channel system capable of associating ten calling line circuits with ten called line circuits. In order to simplify the drawing, only the first two calling line circuits and the first two called line circuits have been shown.

Each of the calling line circuits includes an analog signal source, such as analog signal source 100, which is coupled to the collector electrode of a sampling transistor, such as sampling transistor 102, by a transformer, such as transformer 104. The emitter electrode of the sampling transistor of each calling line circuit is connected to terminal A thereof and the base electrode of the sampling transistor of each calling line circuit is connected to terminal B thereof through resistance 106 bypassed by capacitance 108.

Each called line circuit includes a blocking oscillator 110, having a triggering input connected to terminal B thereof. The blocking oscillator, in response to being triggered, applies a 1 microsecond wide pulse across a normally closed bridge gate, such as bridge gate 112, to effect the opening thereof. The bridge gate of each called line circuit, when open, connects terminal A thereof to the input of a lowpass filter, such as lowpass filter 114. The output from the lowpass filter of each called line circuit is applied to a utilization means (not shown) through an output transformer, such as output transformer 116.

Modulating ramp generator 118 produces a periodic modulating ramp signal which recurs at a major frame period of 50 microseconds.

Pulse distributor 120, which may consist of a ten-stage ring counter having a 10 megacycle per second trigger applied thereto, produces as outputs from the ten respective stages thereof ten sequential 0.1 microsecond wide multiplexing pulses which recur at a minor frame period of 1 microsecond.

Each of the ten multiplexing pulse outputs of pulse distributor 120 is individually associated with one of the calling line circuits by similar circuitry. More specifically, the multiplexing pulse output of stage 1 of pulse distributor 120 is applied as a first input to AND gate 122–1 and as a first input to AND gate 124–1. A 10 megacycle clock pulse is applied as a second input to AND gate 122–1 and an enabling signal from flip-flop 126–1 is applied as a third input to AND gate 122–1. The output from AND gate 122–1 is inverted by inverter 128–1 and applied as an input to terminal B of calling line circuit 1 and also as a first input to crosspoint matrix 130.

The multiplexing pulse output of stage 2 of pulse distributor 120 is associated with calling line circuit 2 and crosspoint matrix 130 by corresponding structure, namely, AND gate 122–2, AND gate 124–2, flip-flop 126–2 and inverter 128–2. Similar corresponding structure is utilized to associate the multiplex pulse output of each of the remaining stages 3–10 of pulse distributor 120 with the remaining calling line circuits 3–10 (not shown) and crosspoint matrix 130.

Crosspoint matrix 130, which is well known in the art, serves to steer the signal applied to any respective input thereof to a desired one of a plurality of outputs therefrom in accordance with control information applied to crosspoint matrix 130.

For illustrative purposes, it will be assumed that calling line circuit 1 is to be associated with called line circuit 2′ and calling line circuit 2 is to be associated with called line circuit 1′. In this case, the multiplex pulse applied as a first input to crosspoint matrix 130, which is derived from stage 1 of pulse distributor 120, will be steered by crosspoint matrix 130 so as to be applied as a first input to AND gate 132–2, associated with called line circuit 2′. Furthermore, in this case, the multiplex pulse applied as a second input to crosspoint matrix 130, which is derived from stage 2 of pulse distributor 120, will be steered by crosspoint matrix 130 so as to be applied as a first input to AND gate 132–1 associated with called line circuit 1′. Additional AND gates, corresponding to AND gates 132–1 and 132–2, are individually associated with each of the remaining called line circuits in accordance with control information applied to matrix 130.

As shown, terminals A of all the calling line circuits are connected in multiple to the base electrode of comparator transistor 134 and the modulating ramp signal from modulating ramp generator 118 is applied as an input to the emitter electrode of comparator transistor 134.

The output from comparator transistor 134, after being inverted by inverter 136, is applied as a second input to AND gates 132–1, 132–2 and the corresponding AND gates (not shown) associated with the remaining called line circuits.

The output from comparator transistor 134, after being inverted by inverter 136, is also applied as a second input to AND gates 124–1, 124–2 and the corresponding AND gates (not shown) associated with stages 3–10 of pulse distributor 120.

The respective outputs of AND gates 132–1, 132–2, etc., are individually connected to terminal B of the associated called line circuit, as shown.

A demodulating ramp generator 138, which provides a periodic demodulating ramp signal which is isochronous with the modulating ramp signal, but which may have a greater magnitude than the magnitude of the modulating ramp signal, is applied in multiple to terminal A of each of the called line circuits.

The outputs of AND gates 124–1, 124–2, etc., are individually applied as inputs to the corresponding flip-flop circuits 126–1, 1262–2, etc., to effect the switching of a flip-flop from a first stable state thereof to a second. When a flip-flop has been switched to its second stable state, the enabling input applied therefrom to the corresponding one of AND gates 122–1, 122–2, etc., is removed.

Modulating ramp generator 118, at the end of each period thereof, applies a resetting pulse to all of flip-flops 126–1, 126–2, etc., to switch these flip-flops back to the first stable state thereof.

Considering now the operation of the system, it will be seen that pulse distributor 120 serves to assign a particular time position to each of the calling line circuits, calling line circuit 1 being assigned time position 1, calling line circuit 2 being assigned time position 2, etc. Each of the called line circuits is also assigned a particular time position, this time position being determined by crosspoint matrix 130 in accordance with the control applied thereto. It has been assumed that called line circuit 2′ has been assigned time position 1 and called line circuit line 1′ has been assigned time position 2.

During its assigned time position, the sampling transistor, such as transistor 102, of each calling line circuit will be rendered conducting, to thereby apply a sample of the analog signal of that calling line circuit to the base electrode of comparator transistor 134. Samples for each calling line circuit will recur at 1 microsecond intervals, the minor frame rate. Since the 1 microsecond minor frame rate is an insignificant portion of the 50 microsecond major frame period of the modulating ramp signal, there will be little change in the instantaneous amplitude of the modulating ramp signal between successive samplings of a calling line circuit.

Comparator transistor 134 compares the instantaneous amplitude of the modulating ramp signal applied to the emitter electrode thereof with each of the samples applied to the base electrode thereof. As long as the instantaneous amplitude of the modulating ramp signal is smaller than the amplitude of the sample, comparator transistor 134 will remain nonconducting. However, when the instantaneous amplitude of the modulating ramp signal finally exceeds the amplitude of the sample, comparator transistor 134 will produce an output pulse. This output pulse will occur during the time position of the calling line circuit then applying a sample to comparator transistor 134. The output pulse from comparator transistor 134 will be passed by one of AND gates 132–1, 132–2, etc., to terminal B of that called line circuit which is assigned the same time position as the calling line circuit then being sampled. This will result in the blocking oscillator of that called line circuit being triggered to open the bridge gate thereof to thereby apply the instantaneous amplitude of the demodulating ramp signal then present at terminal A thereof to the input of the lowpass filter thereof. Since the demodulating and modulating ram signals are isochronous, the instantaneous amplitude of the demodulating ramp signal applied to lowpass filter 114 will be proportional to the amplitude of the analog signal sample applied to comparator transistor 134. However, since the demodulating ramp signal has a greater magnitude than the ramp signal, amplification will be achieved.

In order to prevent any one calling line circuit from providing more than one output pulse from comparator circuit 134 during the major frame period of the modulating ramp signal, the output pulse from comparator circuit 134 is passed by one of AND gates 124–1, 124–2, etc., to that one of flip-flops 126–1, 126–2, etc., which is associated with the calling line circuit then being sampled. In response thereto, this one flip-flop is switched to its second stable state, thereby removing the enabling input applied therefrom to the corresponding one of AND gates 122–1, 122–2, etc. With this AND gate disabled, no further sampling takes place of a calling line circuit which has already produced an output pulse from comparator circuit 134 until the end of the major frame period, when all of flip-flops 126–1, 126–2, etc., are returned to their first stable state. Thus, during each major frame period one and only one output pulse from comparator circuit 134 is produced in response to each analog signal of each calling line circuit.

It will be seen that the lowpass filter of each called line circuit has successive pulse inputs applied thereto each successive major frame period. The lowpass filter integrates the successive inputs to reconstitute the analog signal transmitted thereto.

Although only a preferred embodiment of the invention has been described in detail herein, it is not intended that the invention be restricted thereto, but that it be limited only by the true spirit and scope of the appended claims.

What is claimed is:

1. Pulse position apparatus for transmitting an analog signal from an originating point to a terminating point, said apparatus comprising a modulating ramp generator for generating a periodic modulating ramp signal, first means having said analog signal and said modulating ramp signal applied thereto for producing an output pulse in response to the instantaneous amplitude of said analog signal being substantially equal to the instantaneous amplitude of said modulating ramp signal, a lowpass filter at said terminating point, a demodulating ramp generator for generating a periodic demodulating ramp signal isochronous with said modulating ramp signal, a normally closed gate for applying said demodulating ramp signal as an input to said filter, and means for applying said output pulse to said gate to effect the momentary opening thereof.

2. The apparatus defined in claim 1, wherein the magnitude of said demodulating ramp signal is greater than the magnitude of said modulating ramp signal.

3. Pulse position apparatus for transmitting each of a plurality of analog signals from respective individual originating points to respective individual terminating points corresponding thereto, said apparatus comprising a modulating ramp generator for generating a periodic modulating ramp signal, a demodulating ramp generator for generating a periodic demodulating signal isochronous with said modulating ramp signal, a separate individual lowpass filter at each terminating point, a separate individual normally closed gate at each terminating point for applying said demodulating ramp signal as an input to the filter thereof, a separate individual AND gate coupled to each respective one of said normally closed gates to effect the momentary opening of that respective one of said normally closed gates which has an output from the separate individual AND gate coupled thereto, whereby each of said separate individual AND gates is associated with a particular terminating point, first means including a cyclically-operated pulse distributor for normally sampling each analog signal in sequence and simultaneously therewith applying a first input to the separate individual AND gate associated with the terminating point corresponding thereto, the length of said cycle being an insignificant portion of a ramp signal period, comparator means for comparing the relative amplitudes of each analog signal and said modulating ramp signal to produce an output pulse in response to the amplitude of said modulating ramp signal exceeding the amplitude of an analog signal, second means for applying each output pulse to said first means to prevent further sampling of that analog signal producing that output pulse for the remainder of that ramp signal period, and third means for applying each output pulse as a second input to all said separate individual AND gates.

4. The apparatus defined in claim 3, wherein said second means includes an individual bistable device corresponding to each analog signal, fourth means responsive to a bistable device being in a first stable state thereof for permitting sampling of the analog signal corresponding thereto and responsive to a bistable device being in a second stable state thereof for preventing sampling of the analog signal corresponding thereto, fifth means for switching a bistable device corresponding to an analog signal from said first to said second stable states thereof in response to an output pulse produced by that analog signal, and sixth means coupled to one of said ramp generators for switching all said bistable devices back to said first stable state thereof in response to the end of a ramp signal period.

5. The apparatus as defined in claim 3, wherein the magnitude of said demodulating ramp signal is greater than the magnitude of said modulating ramp signal.

References Cited in the file of this patent

UNITED STATES PATENTS

| | | |
|---|---|---|
| 2,427,500 | Houghton | Sept. 16, 1947 |
| 2,543,736 | Trevor | Feb. 27, 1951 |
| 2,546,974 | Chatterjea et al. | Apr. 3, 1951 |